(12) United States Patent
Bolourchi et al.

(10) Patent No.: US 8,930,081 B2
(45) Date of Patent: Jan. 6, 2015

(54) SYSTEM FOR INDICATING AN IMPENDING VEHICLE MANEUVER

(75) Inventors: Farhad Bolourchi, Saginaw, MI (US); Timothy W. Kaufmann, Frankenmuth, MI (US); Ashok Chandy, Fenton, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 245 days.

(21) Appl. No.: 13/426,383

(22) Filed: Mar. 21, 2012

(65) Prior Publication Data

US 2013/0253765 A1 Sep. 26, 2013

(51) Int. Cl.
*B62D 5/02* (2006.01)

(52) U.S. Cl.
USPC .............. 701/42; 701/400; 180/446

(58) Field of Classification Search
CPC .... G06F 3/016; B62D 15/025; B62D 15/029; B60W 10/20
USPC ............ 701/41, 36, 42, 400; 180/443, 446
See application file for complete search history.

(56) References Cited

U.S. PATENT DOCUMENTS

| | | | |
|---|---|---|---|
| 7,719,431 B2 | 5/2010 | Bolourchi | |
| 2004/0262063 A1 | 12/2004 | Kaufmann et al. | |
| 2009/0292466 A1* | 11/2009 | McCarthy et al. | 701/213 |
| 2010/0280713 A1 | 11/2010 | Stahlin et al. | |
| 2011/0098922 A1 | 4/2011 | Ibrahim | |
| 2011/0187518 A1 | 8/2011 | Strumolo et al. | |

FOREIGN PATENT DOCUMENTS

DE 10212782 A1 10/2003

OTHER PUBLICATIONS

European Search Report for European Application No. 13159950.8; Dated: Jun. 6, 2013; 7 pages.

* cited by examiner

*Primary Examiner* — Thomas Tarcza
*Assistant Examiner* — Kevin Myhre
(74) *Attorney, Agent, or Firm* — Cantor Colburn LLP

(57) ABSTRACT

A system for indicating an impending vehicle maneuver within a predetermined distance is provided. The system includes a navigational system and a control module. The navigational system receives a vehicle destination and determines a current geographical vehicle position. The navigational system determines if the impending vehicle maneuver is required within the predetermined distance based on the vehicle destination and the current geographical vehicle position. The control module is in communication with the navigational system and a handwheel. The control module sends a signal that creates a steering assist torque in the handwheel if the impending vehicle maneuver is required.

20 Claims, 3 Drawing Sheets

SYSTEM FOR INDICATING AN IMPENDING VEHICLE MANEUVER

FIELD OF THE INVENTION

The present invention relates to a system for providing a steering assist torque, and in particular to a system providing a steering assist torque to a handwheel if an impending vehicle maneuver is required.

BACKGROUND OF THE INVENTION

Navigational systems generally employ audio aids such as voice instructions or chimes, as well as visual aids such as diagrams and text. The diagrams and text may be shown on an in-vehicle display. As the navigational system provides instructions to a specific location, the audio aids may instruct the driver to take an exit or make a turn. The visual aids will show arrows or other visual indicators that instruct a driver to take an exit or make a turn. However, several drawbacks may exist with the current approach of providing route guidance.

For example, a driver may direct his or her attention away from the roadway to view the in-vehicle display for a relatively short period of time. Also, audio aids such as voice instructions or chimes may sometimes become irritating or annoying to the driver and other occupants of the vehicle. Thus, the driver may ignore the audio aids, and miss an exit or a turn.

SUMMARY OF THE INVENTION

A system for indicating an impending vehicle maneuver within a predetermined distance is provided. The system includes a navigational system and a control module. The navigational system receives a vehicle destination and determines a current geographical vehicle position. The navigational system determines if the impending vehicle maneuver is required within the predetermined distance based on the vehicle destination and the current geographical vehicle position. The control module is in communication with the navigational system and a handwheel. The control module sends a signal that creates a steering assist torque in the handwheel if the impending vehicle maneuver is required.

In another embodiment, a system for indicating an impending vehicle maneuver within a predetermined distance is provided. The system includes a navigational system, a lane keeping system having a camera, and a control module. The navigational system receives a vehicle destination and determines a current geographical vehicle position. The navigational system determines if the impending vehicle maneuver is required within the predetermined distance based on the vehicle destination and the current geographical vehicle position. The camera collects data indicating a presence of lane markings. The control module is in communication with the navigational system, the camera, and a handwheel. The control module sends a signal that creates a steering assist torque in the handwheel if the impending vehicle maneuver is required. The steering assist torque is generally oriented in a same direction as the impending vehicle maneuver. The control module adjusts the signal that creates the steering assist torque based on the lane markings.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
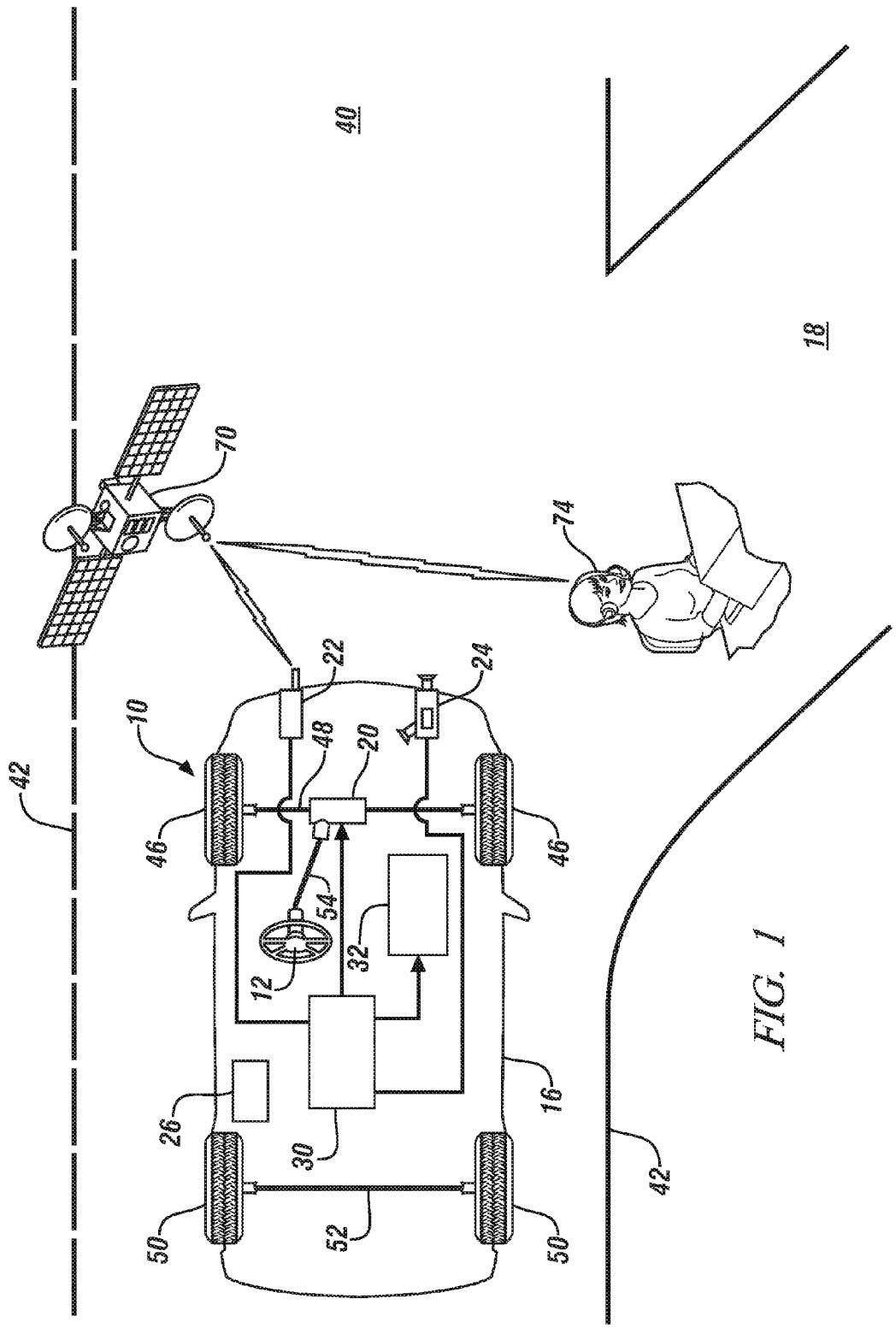
FIG. 1 is a schematic diagram of a vehicle having an exemplary system for providing a steering assist torque to a handwheel.

Referring now to the Figures, where the invention will be described with reference to specific embodiments, without limiting same, FIG. 1 illustrates a system 10 in a vehicle 16 accordance with one aspect of the invention. The system 10 provides a steering assist torque to a handwheel 12 if an impending vehicle maneuver 18 is required. In the exemplary embodiment as shown, the impending vehicle maneuver 18 is an exit off a highway, however, it is understood that various types of vehicle maneuvers that require turning the handwheel 12 may be included as well. For example, the impending vehicle maneuver 18 may be a generally perpendicular left or right turn, or a highway turnabout (e.g., on a divided highway, special U-turn ramps exist to allow traffic to make a U-turn). The system 10 includes a steering actuator 20, a telematics system 22, a camera 24, a navigational system 26, a control module 30, and an onboard warning system 32. In the exemplary embodiment as shown, the vehicle 16 is positioned within a lane 40 having various lane markers 42, where the left lane markers 42 are dashed and the right lane markers 42 are solid.

The handwheel 12 controls an angle of left and right front road wheels 46 in an exemplary front wheel steering configuration. The left and right front road wheels 46 are coupled through a rack and pinion steering mechanism 48. The vehicle 16 also includes left and right rear road wheels 50 coupled through a rear axle 52. In exemplary embodiments, as the handwheel 12 is rotated, the angular position of the handwheel 12 may be determined through a handwheel angle sensor (not shown). The handwheel 12 and the rack and pinion steering mechanism 48 may be coupled through a steering shaft 54 and the steering actuator 20.

The steering actuator 20 may include an electric motor (not shown) in a steering actuation system, such as active front steering (AFS), steer by wire (SBW) or hydraulic power steering (HPS). In exemplary embodiments, the steering actuator 20 is part of an electric power steering (EPS) system. While the steering actuator 20 is depicted in FIG. 1 as distributed along the rack and pinion mechanism 48, in exemplary embodiments, the steering actuator may be positioned at other locations such as at the coupling junction between the steering shaft 54 and the rack mechanism 48, etc. Positional determinations of the steering actuator 20 may be determined through a motor position sensor (not shown), which may also be used to calculate the angular position of the handwheel 12.

The control module 30 is in communication with the steering actuator 20, the telematics system 22, the camera 24, the navigational system 26, and the onboard warning system 32. It should be noted that the arrangement of the steering actuator 20, the telematics system 22, the camera 24, the navigational system 26, and the onboard warning system 32 illustrated in FIG. 1 is exemplary and other arrangements may be used as well. In various embodiments, the control module 30 may include one or more sub-modules and datastores. The control module 30 also receives input signals from various sensors on the vehicle 16 such as, but not limited to, a handwheel angle sensor, a motor position sensor, rack position sensors, a vehicle speed sensor, a yaw rate sensor, a lateral acceleration sensor, (not shown). As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

The control module 30, the steering actuator 20, and the camera 24 are part of a lane keeping system. The camera 24 collects data indicating the presence of the lane markings 42 and sends data indicating the lane markings 42 to the control module 30. The control module 30 may generate output signals to the steering actuator 20, such as, but not limited to, feedback for a corrective input into the handwheel 12 in the event a path deviation within the lane 40 is detected.

The navigational system 26 is used for route planning and guidance of the vehicle 16. For example, the navigational system 26 may include a global positioning system (GPS), an inertial measurement system, or both the GPS and the inertial measurement system. The inertial measurement system may also be referred to as an inertial navigation system, and is a navigational aid that employs motion sensors (accelerometers) and rotation sensors (gyroscopes) to calculate the position, orientation, and velocity (direction and speed of movement) of the vehicle 16. In one exemplary embodiment, the GPS system may be a high-accuracy GPS system that utilizes the L2 band (e.g., 1227.60 MHz) or L5 (1176.45 MHz).

The navigational system 26 receives a vehicle destination that is inputted by a vehicle occupant. The vehicle destination indicates a desired end location of the vehicle 16. For example, the vehicle destination may be an address (e.g., 1640 Riverside Drive) or a specific point of interest (POI) (e.g., a restaurant or an airport). The navigational system 26 determines the current geographical vehicle position, and determines if the impending vehicle maneuver 18 is required within a predetermined distance. For example, if the vehicle 16 is supposed to take an exit off a highway, then the impending vehicle maneuver 18 is the exit as illustrated in FIG. 1. It should be noted that the predetermined distance may vary depending on the type of vehicle maneuver. For example, the predetermined distance may be about two miles or more for an exit off a highway, and about 0.2 miles for a right or left turn off a two-lane street.

The navigational system 26 is in communication with the control module 30 to send information to the control module 30 and the lane keeping system indicating that the vehicle 16 is within the predetermined distance of the impending vehicle maneuver (e.g., that the vehicle 16 is approaching impending vehicle maneuver 18). The lane keeping system identifies the lane markers 42 to guide the vehicle 16 within the lane 40. For example, in the embodiment as shown, the right lane markers 42 are solid, which indicate that the vehicle is in a right hand lane. If the impending vehicle maneuver is the exit as shown in FIG. 1, then the lane keeping system would track the right lane solid markers 42 and direct the vehicle 16 to the exit.

The onboard warning system 32 may be a visible indicator such as, for example, a liquid crystal display (LCD). The onboard warning system 32 may also include an audible indicator if a separate speaker is not included. In the event that the vehicle 16 is within the predetermined distance of the impending vehicle maneuver, the onboard warning system 32 may provide a visual indication and/or an audible indication of the impending vehicle maneuver. The control module 30 also sends a signal to the steering actuator 20, which creates a steering assist torque in the handwheel 12. Specifically, the steering assist torque in the handwheel 12 is generally oriented in the same direction as the impending vehicle maneuver. For example, in the embodiment as shown in FIG. 1, the steering assist torque would be oriented to the right hand side.

The control module 30 may also include control logic for adjusting the steering assist torque based on the lane markers 42 as well. Specifically, in one embodiment, the control module 30 may also send an optional bias signal that creates a biased steering assist torque in the handwheel 12 as well. The biased steering assist torque is provided such that the vehicle 16 does not travel over the lane markers 42 on the right hand side. That is, data indicating the presence of the lane markers 42 obtained from the camera 24 is sent to the control module 30, and is used to create the bias signal.

The steering assist torque may be applied in different configurations based on the distance between the vehicle 16 and the impending vehicle maneuver 18. The distance between the vehicle 16 and the impending vehicle maneuver 18 may be determined by the navigational system 26 and sent to the control module 30. For example, referring to FIG. 2, a guiding zone G and an alerting zone A are shown. The guiding distance G is located further away from the impending vehicle maneuver 18 than the alerting zone A. The guiding zone G represents a distance from the impending vehicle maneuver 18 where a driver is gently reminded about the impending vehicle maneuver 18. That is, the steering assist torque in the handwheel 12 is configured for gently or transparently guiding the vehicle 16 towards the impending vehicle maneuver 18 when the vehicle 16 is located within the guiding zone G. As the vehicle 16 enters the alerting zone A, then the driver is alerted to impending vehicle maneuver 18. The steering assist torque in the handwheel 12 may be pulsed to create an alert to the driver.

Referring back to FIG. 1, in the event the driver misses or passes by the impending vehicle maneuver 18, in one exemplary embodiment the control module 30 creates a tactile or haptic feedback to the handwheel 12 to provide a warning vibration indicating that the impending vehicle maneuver 18 (e.g., the exit) has been missed. Also, a call may be made using the telematics system 22 via a satellite 70 to a trained operator 74 who may provide assistance.

Figure 2:
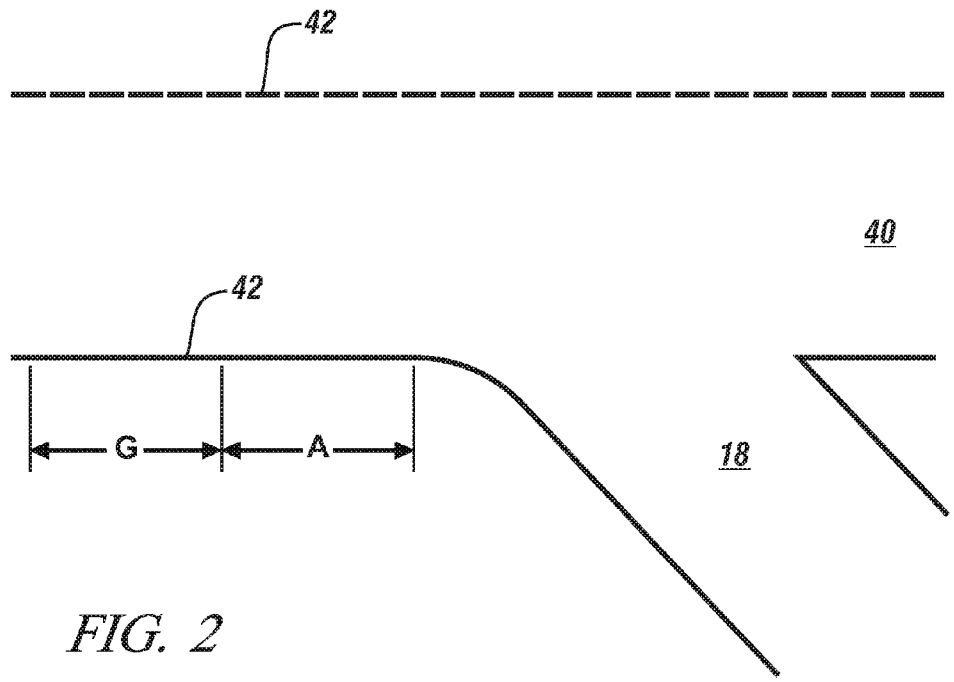
FIG. 2 is an illustration of a lane shown in FIG. 1 according to one aspect of the invention.
Figure 3:
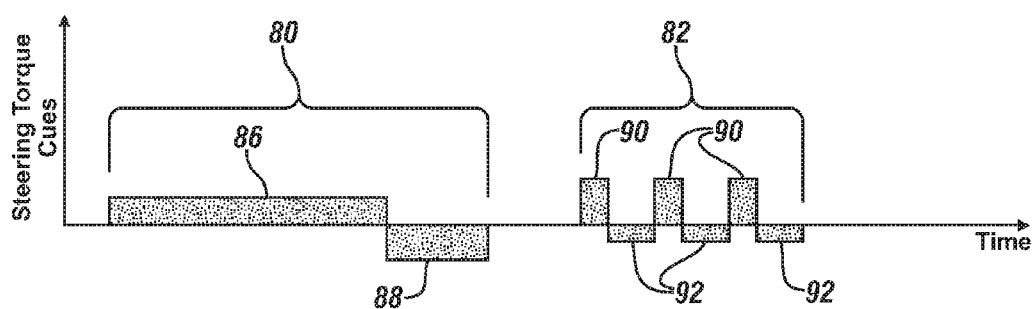
FIG. 3 is an exemplary embodiment of a graph illustrating steering torque cues according to one embodiment of the invention.

FIG. 3 is one exemplary embodiment of a graph illustrating steering torque cues that may be employed to provide indication of an impending vehicle maneuver 18. Referring now to FIGS. 1-3, a set of guided steering assist torque cues 80 as well as a set of alerting steering assist torque cues 82 are shown. The guided steering assist torque cues 80 includes a guiding steering assist torque 86 that is oriented in the same direction as the impending vehicle maneuver 18 and a biased steering assist torque 88 that is oriented in the opposite direction as the impending vehicle maneuver 18. The biased steering assist torque 88 is provided for straightening the vehicle 16 within the lane 40 and to generally avoid drifting too close towards one of the lane markers 42 (illustrated in FIG. 1). That is, guiding steering assist torque 86 rotates the handwheel 18 in a first or guiding direction, and the biased steering assist torque 88 rotates the handwheel 12 in second or biasing direction that is opposite to the guiding direction. In the exemplary embodiment as shown, the guiding steering assist torque 86 is relatively longer in duration than the biased steering assist torque 88, and the biased steering assist torque 88 has a greater magnitude than the guiding steering assist torque 86, however it is to be understood that other configurations may be used as well.

As the vehicle 16 enters the alerting zone A (shown in FIG. 2), the alerting steering assist torque cues 82 are applied. In the embodiment as shown, the alerting steering assist torque cues 82 are a series of relatively short pulses that are exerted on the handwheel 12, and provide a tactile indication to a driver of the impending vehicle maneuver 18. Specifically, a series of positive pulses 90 that are oriented in the same direction as the impending vehicle maneuver 18 are provided as well as a series of negative or biased pulses 92 that are oriented in an opposite direction of the impending vehicle maneuver 18. The positive pulses 90 may be greater in magnitude when compared to the guiding steering assist torque 86 and the biased pulses 92. The biased pulses 92 may be provided for the same reasons similar to biased pulses 88. That is, the biased pulses 92 are provided such that the vehicle 16 does not generally turn in the direction of the impending vehicle maneuver 18 (e.g., such that the vehicle 16 is not turned towards the impending vehicle maneuver 18 without driver input). However, in one embodiment, the biased pulses 92 may be removed if movement towards the impending vehicle maneuver 18 without driver input is desired.

Figure 4:
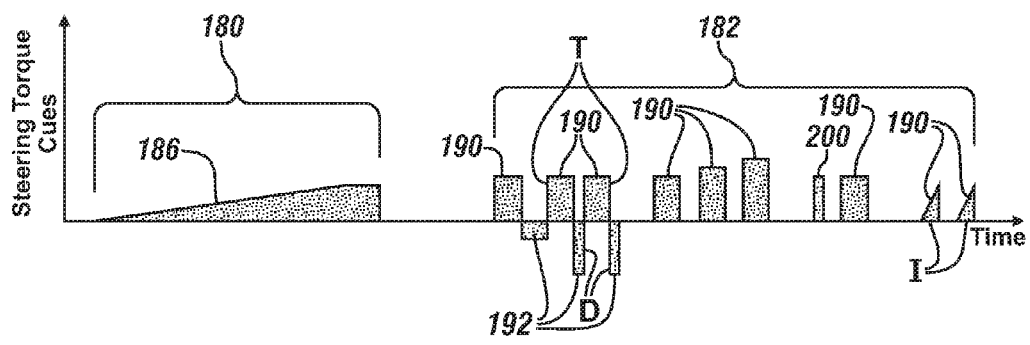
FIG. 4 is an exemplary embodiment of a graph illustrating steering torque cues according to another embodiment of the invention.

FIG. 4 is an alternative embodiment of a graph illustrating steering torque cues that may be employed to provide indication of an impending vehicle maneuver 18. Referring now to FIGS. 1-2 and 4, a guided steering assist torque cue 180 as well as a set of alerting steering assist torque cues 182 are shown. The guided steering assist torque cues 180 includes a guiding steering assist torque 186 that is oriented in the same direction as the impending vehicle maneuver 18. The guiding steering assist torque 186 gradually increases in magnitude, and is then followed by a leveling in magnitude. In the embodiment as shown in FIG. 4, the biased steering assist torque is omitted.

As the vehicle 16 enters the alerting zone A (shown in FIG. 2), the alerting steering assist torque cues 182 are applied as a series of relatively short pulses that are exerted on the handwheel 12 (shown in FIG. 1), and provide a vibration, a haptic input, or tactile indication to a driver of the impending vehicle maneuver 18. Specifically, a series of positive pulses 190 that are oriented in the same direction as the impending vehicle maneuver 18 are provided, as well as a series of negative or biased pulses 192 that are oriented in an opposite direction of the impending vehicle maneuver 18. The positive pulses 190 and the biased pulses 192 may vary in at least magnitude, duration, and/or the amount of time between each biased pulse 190. For example, the biased pulses 192 may be shorter in duration (and are denoted as D) such that some of the later positive pulses 190 (which are denoted as T) are timed closer together. The positive pulses 190 may also gradually increase in magnitude (and are denoted as I). Some of the positive pulses 190 may also vary in duration as well. For example, FIG. 4 illustrates one of the positive pulses 200 that is of a shorter duration than the remaining positive pulses 190. Also, a portion of the biased pulses 192 may include a greater magnitude than the remaining biased pulses 192 (and are denoted as D).

Figure 5:
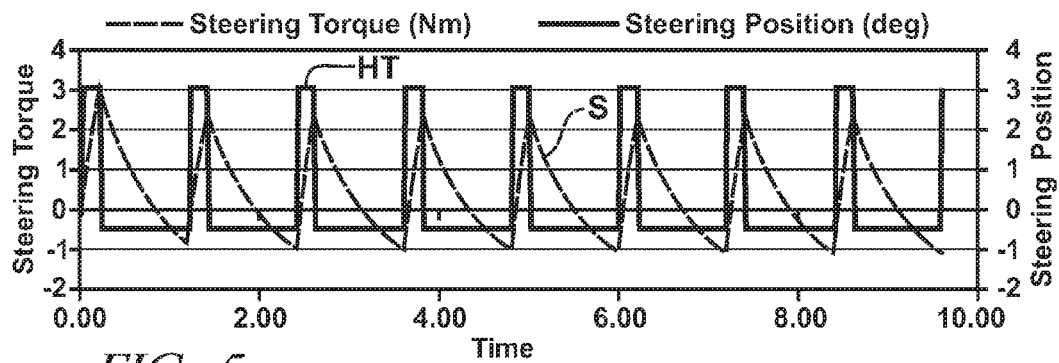
FIG. 5 is an exemplary embodiment of a graph illustrating one embodiment for exerting biased pulses on a handwheel shown in FIG. 1.
Figure 6:
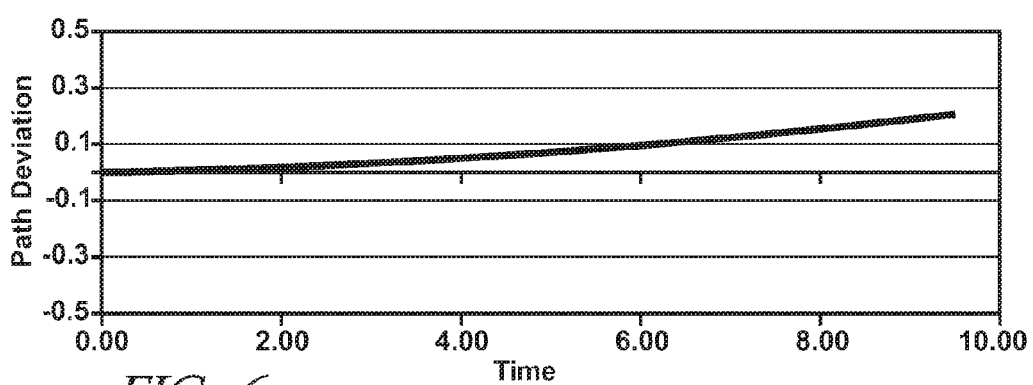
FIG. 6 is an illustration of a corresponding path deviation employing the approach as shown in FIG. 5.
Figure 7:
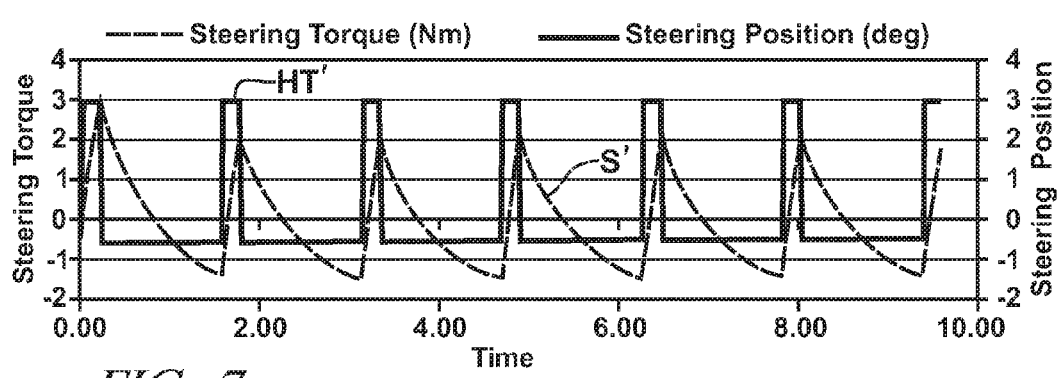
FIG. 7 is an illustration of an alternative approach of a graph illustrating another embodiment for exerting biased pulses on a handwheel shown in FIG. 1.
Figure 8:
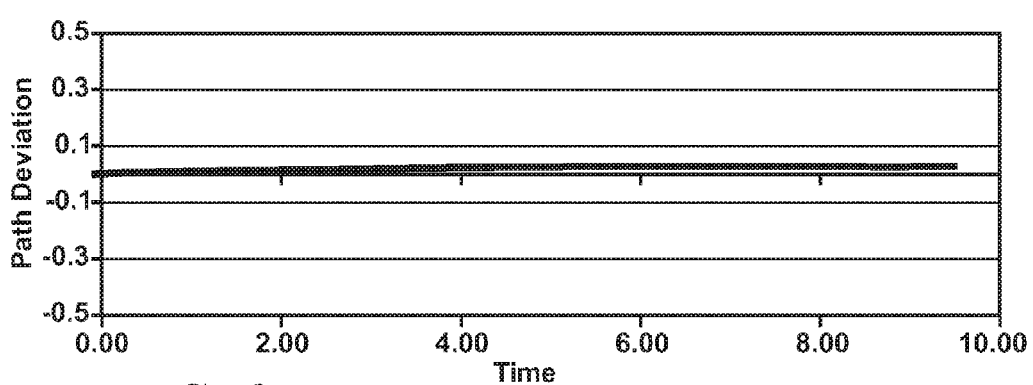
FIG. 8 is an illustration of a corresponding path deviation employing the approach as shown in FIG. 7.

In one embodiment, the biased pulses (e.g., 92, 192) are used if movement towards the impending vehicle maneuver 18 without driver input is not desired in the alerting zone A. That is, the target path deviation between the left and right hand side lane markers 42 when the vehicle 18 is in the alerting zone A (FIG. 2) is zero. In the exemplary approach as illustrated in FIG. 5, the handwheel torque HT has an average value of about zero. FIG. 5 also illustrates the steering position, which is denoted as an 'S' of the handwheel 12, with no additional driver input. FIG. 6 is an illustration of the corresponding path deviation between the left and right hand side markers 42 (FIG. 1). FIG. 6 indicates that positive pulses (e.g., the positive pulses 90 shown in FIG. 3 or the positive pulses 190 shown in FIG. 4) are provided, and the vehicle 16 will be steered towards the impending vehicle maneuver 18 (shown in FIG. 1). FIG. 7 is another approach of applying the torque pulses. In the embodiment as shown in FIG. 7, the handwheel torque HT' is based on driver input or reaction on the handwheel, where the average steering position S' of the handwheel is about zero. FIG. 8 is an illustration of the corresponding path deviation between the left and right hand side markers 42 (FIG. 1). Referring now to FIGS. 5-8, the approach as shown in FIG. 7 generally results in less path deviation when compared to the approach as shown in FIG. 6.

The system 10 as described above and illustrated in FIGS. 1-8 provides steering assist torque to the handwheel 12 if an impending vehicle maneuver 18 is required, thereby providing guidance to a driver. The present approach of providing steering assist torque to the handwheel 12 does not generally require a driver to direct his or her attention away from the roadway, and may not be as irritating as voice instructions or chimes. Thus, in some embodiments, the onboard warning system 32 may not be required to activate a visible indicator or an audio indicator if an impending vehicle maneuver is required, and instead the steering assist torque is provided to the handwheel 12.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A system for indicating an impending vehicle maneuver within a predetermined distance, comprising:
    a navigational system for receiving a vehicle destination and determining a current geographical vehicle position, the navigational system determining if the impending vehicle maneuver is required within a first predetermined distance or a second predetermined distance based on the vehicle destination and the current geographical vehicle position, the first predetermined distance being different than the second predetermined distance; and
    a control module in communication with the navigational system and a handwheel, the control module sending a signal that creates a steering assist torque in the handwheel, the steering assist torque guiding a vehicle towards the impending vehicle maneuver by deviating the vehicle within a lane if the impending vehicle maneuver is required within the first predetermined distance, the steering assist torque creating an alert to a driver of the vehicle without deviating the vehicle within the lane without driver input if the impending vehicle maneuver is required within the second predetermined distance.

2. The system as recited in claim 1, comprising a lane keeping system having a camera, the camera collecting data indicating a presence of lane markings, and wherein the camera is in communication with the control module.

3. The system as recited in claim 2, wherein the control module adjusts the signal that creates the steering assist torque based on the lane markings.

4. The system as recited in claim 1, wherein the control module includes control logic for sending a bias signal that creates a biased steering assist torque to the handwheel, the biased steering assist torque oriented in an opposite direction of the impending vehicle maneuver.

5. The system as recited in claim 4, wherein steering assist torque rotates the handwheel in a guiding direction, and the biased steering assist torque rotates the handwheel in a biasing direction that is opposite to the guiding direction.

6. The system as recited in claim 5, wherein the biased steering assist torque is provided as a plurality of pulses, and the plurality of pulses vary in at least one of magnitude, duration, and an amount of time between each of the plurality of pulses.

7. The system as recited in claim 5, wherein a biased magnitude of the biased steering assist torque is greater than a magnitude of the steering assist torque.

8. The system as recited in claim 5, wherein the steering assist torque includes a steering assist duration that is greater than a biased duration of the biased steering assist torque.

9. The system as recited in claim 1, wherein the assist torque is applied in different configurations based on a distance between the vehicle and the impending vehicle maneuver, the distance determined by the navigational system.

10. A system for indicating an impending vehicle maneuver within a predetermined distance, comprising:
a navigational system for receiving a vehicle destination and determining a current geographical vehicle position, the navigational system determining if the impending vehicle maneuver is required within a first predetermined distance or a second predetermined distance based on the vehicle destination and the current geographical vehicle position, the first predetermined distance being different than the second predetermined distance; and
a control module in communication with the navigational system and a handwheel, the control module sending a signal that creates a steering assist torque in the handwheel, the steering assist torque guiding a vehicle towards the impending vehicle maneuver by deviating the vehicle within a lane if the impending vehicle maneuver is required within the first predetermined distance, the steering assist torque creating an alert to a driver of the vehicle without deviating the vehicle within the lane if the impending vehicle maneuver is required within the second predetermined distance,
wherein the first and second predetermined distances are defined by the control module, and wherein the first predetermined distance is longer than the second predetermined distance.

11. The system as recited in claim 1, wherein the first and second predetermined distances are defined by the control module, and wherein the second predetermined distance is longer than the first predetermined distance.

12. The system as recited in claim 1, wherein the steering assist torque to the handwheel is pulsed to provide a warning vibration if the impending vehicle maneuver has been missed by the vehicle.

13. The system as recited in claim 1, wherein the navigational system includes at least one of a global positioning system (GPS) and an inertial measurement system.

14. The system as recited in claim 1, comprising a steering actuator, wherein the control module control module sends the signal to the steering actuator to create the steering assist torque in the handwheel.

15. A system for indicating an impending vehicle maneuver within a predetermined distance, comprising:
a navigational system for receiving a vehicle destination and determining a current geographical vehicle position, the navigational system determining if the impending vehicle maneuver is required within a first predetermined distance or a second predetermined distance from the current geographical vehicle position based on the vehicle destination and the current geographical vehicle position;
a lane keeping system having a camera, the camera collecting data indicating a presence of lane markings; and
a control module in communication with the navigational system, the camera, and a handwheel, the control module sending a signal that creates a steering assist torque in the handwheel, the steering assist torque guiding a vehicle towards the impending vehicle maneuver by deviating the vehicle within a lane if the impending vehicle maneuver is required within the first predetermined distance, the steering assist torque creating an alert to a driver of the vehicle without deviating the vehicle within the lane if the impending vehicle maneuver is required within the second predetermined distance, the control module adjusting the signal that creates the steering assist torque based on the lane markings,
wherein the first and second predetermined distances are defined by the control module, and wherein the first predetermined distance is longer than the second predetermined distance.

16. The system as recited in claim 15, comprising, wherein the control module includes control logic for sending a bias signal that creates a biased steering assist torque to the handwheel, the biased steering assist torque oriented in an opposite direction of the impending vehicle maneuver.

17. The system as recited in claim 16, wherein steering assist torque rotates the handwheel in a guiding direction, and the biased steering assist torque rotates the handwheel in a biasing direction that is opposite to the guiding direction.

18. The system as recited in claim 17, wherein the biased steering assist torque is provided as a plurality of pulses, and wherein the plurality of pulses vary in at least one of magnitude, duration, and an amount of time between each of the plurality of pulses.

19. The system as recited in claim 17, wherein a biased magnitude of the biased steering assist torque is greater than a magnitude of the steering assist torque.

20. A system for indicating an impending vehicle maneuver within a predetermined distance, comprising:
a navigational system for receiving a vehicle destination and determining a current geographical vehicle position, the navigational system determining if the impending vehicle maneuver is required within a first predetermined distance or a second predetermined distance based on the vehicle destination and the current geographical vehicle position, the first predetermined distance being different than the second predetermined distance; and a control module in communication with the navigational system and a handwheel, the control module sending a signal that creates a steering assist torque in the handwheel, the steering assist torque guiding a vehicle towards the impending vehicle maneuver by deviating the vehicle within a lane if the impending vehicle maneuver is required within the first predetermined distance, the steering assist torque creating an alert to a driver of the vehicle, and the control module creating at least one biased torque preventing deviation of the vehicle within the lane if the impending vehicle maneuver is required within the second predetermined distance.

* * * * *